J. H. BOYE.
MIRROR DEVICE.
APPLICATION FILED OCT. 21, 1914.
1,175,505.
Patented Mar. 14, 1916.
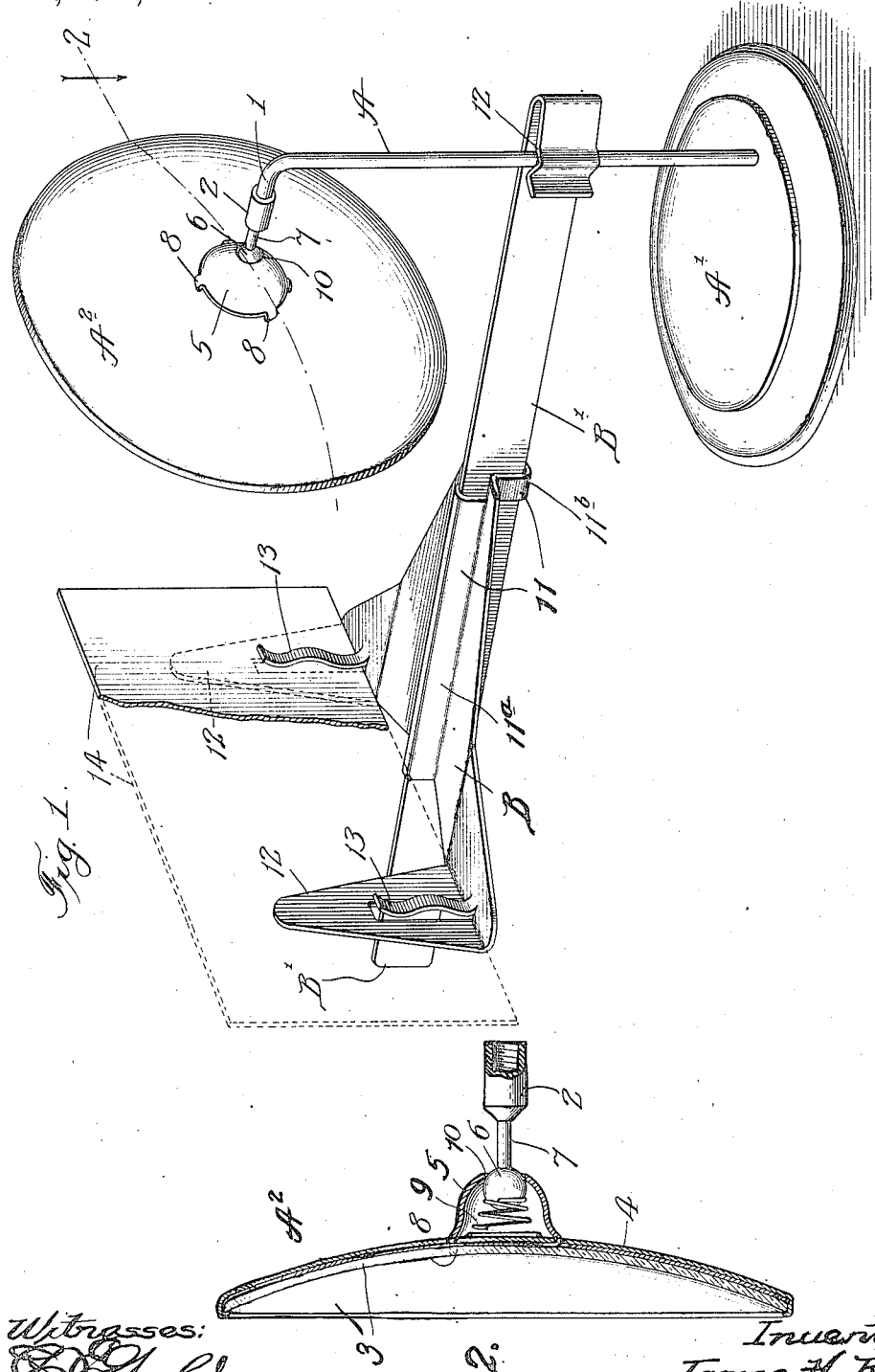

UNITED STATES PATENT OFFICE.

JAMES H. BOYE, OF CHICAGO, ILLINOIS, ASSIGNOR TO THE BOYE NEEDLE COMPANY, OF CHICAGO, ILLINOIS, A CORPORATION OF ILLINOIS.

MIRROR DEVICE.

1,175,505.  Specification of Letters Patent.  Patented Mar. 14, 1916.

Application filed October 21, 1914. Serial No. 867,757.

*To all whom it may concern:*

Be it known that I, JAMES H. BOYE, a citizen of the United States, residing at Chicago, in the county of Cook and State of Illinois, have invented a new and useful Improvement in Mirror Devices, of which the following is a specification.

My invention relates particularly to mirror devices adapted for picture exhibiting purposes. The mirror is adapted to give an enlarged image of a picture, or any object which may be placed in front of it.

My primary object is to provide a magnifying picture-exhibiting device which is of simple and cheap construction, and which is well adapted to its purpose. The mirror and its mounting may be employed for toilet purposes, if desired.

The invention is illustrated in its preferred embodiment in the accompanying drawings, in which—

Figure 1 represents a rear perspective view of my improved mirror device equipped with picture holding means, adapting it for use as a magnifying picture-exhibiting device; and Fig. 2 represents a sectional view of a magnifying mirror and the universal connection employed for mounting the mirror on its standard.

In the illustration given, A represents a standard mounted on a base $A^1$ and carrying a magnifying mirror $A^2$; and B represents a picture holder slidably mounted on a bar or arm $B^1$, which is adjustably mounted on the standard A. In the form shown, the standard A comprises a rod rising from the comparatively heavy cast metal base $A^1$ and having a forwardly turned upper end 1, which has threaded connection with a union or member 2 upon which the mirror $A^2$ is mounted for universal movement.

The glass 3 of the mirror which is dished or of concave form, that is in the form of a section of a hollow sphere, is preferably provided with a sheet-metal back 4 to the central portion of which is secured a socket 5 in which works a ball 6 carried by a forwardly projecting stem 7 with which the union 2 is provided. The socket 5 may comprise a conical or semi-spherical sheet-metal member provided at its edge with attaching lugs 8, which pass through perforations of the sheet-metal back 4 and are clenched against the inner surface thereof.

A conical coil-spring 9 is confined between the ball 6 and the plate 4 within the socket member 5, the small end of the spring engaging a ball, while the stem 7 by which the ball is carried extends through a perforation 10 with which the socket member 5 is provided. It will be understood that the pressure afforded by the spring 9 will cause sufficient friction to hold the mirror in any position to which it may be turned about the ball joint.

The picture cardholder B may be formed of sheet-metal with a guide portion 11 conforming to and freely movable along the bar $B^1$, the member being also provided with up-standing lugs 12 opposed by springs 13, so that the picture card 14 may be held by the support B in front of the mirror. In the form shown, the guide 11 of the member B comprises an upwardly struck central portion $11^a$ which rests upon the upper edge portion of the bar $B^1$, and a loop $11^b$ at the rear end of the guide which engages the under edge of the bar $B^1$.

The bar is simply and adjustably mounted on the rod-form standard A by providing the rear end of the bar with a vertical guide 12 which engages the standard. This guide is formed by bending the rear end of the bar forwardly upon the bar and grooving or striking the bar transversely where it engages the standard. This construction enables the bar to be raised or lowered freely on the standard A, and also enables the bar to be disengaged from the standard, if desired. When adjusted to any position on the standard, the bar will remain in adjusted position because of the friction developed by the turning moment created by the weight of the projecting arm and the picture holder carried thereby. However, the bar $B^1$ is pivotally connected with as well as vertically adjustable on the standard A. That is, the bar may be adjusted vertically, or may be turned through a horizontal plane.

Assuming the eye of the observer to be at a point above and back of the card 14 in the position shown in Fig. 1, the picture will be magnified and reflected to the eye of the observer; and the observer may turn the mirror to enable him to view critically different portions of the picture and procure just the right light upon the picture. That is, the mirror may be tilted in any direction on its universal joint. Some times one person, seated at a table, may arrange the pictures, and then show them to a companion seated by his side, the bar B¹ being swung according to necessity, and the mirror being turned or adjusted to suit the occasion. Thus, two or more persons may view the pictures, without moving the picture-exhibiting device as a whole, and without shifting their own positions. The picture holder B is, of course, freely adjustable longitudinally on the bar B¹ to give the right perspective. If desired, the arm B¹ may be detached from the standard A, and the mirror may then be used for toilet purposes; also, the union 2 may be detached from the standard A and applied to some other suitable support, as in a bath room for shaving purposes.

The foregoing detailed description has been given for clearness of understanding only, and no unnecessary limitation should be understood therefrom, but the appended claims should be construed as broadly as permissible in view of the prior art.

What I regard as new, and desire to secure by Letters Patent, is—

1. In a picture-exhibiting device, the combination with a mirror and support therefor, of a bar adjustably connected with and carried by said support, and a picture-holding device adjustably connected with said bar.

2. The combination with a magnifying mirror and a standard therefor, of an arm pivotally connected with and carried by and vertically adjustable on said standard, and a picture-holder mounted on said arm.

3. The combination with a magnifying mirror and a standard therefor, of an arm pivotally connected with and vertically adjustable on and carried by said standard, and a picture-holder slidably mounted on said arm.

4. In a picture-exhibiting device, the combination of a standard, a magnifying mirror tiltably mounted thereon, an arm pivotally mounted on and vertically adjustable with relation to and carried by said standard, and a picture-holding device adjustably mounted on and carried by said arm.

5. In a picture-exhibiting device, the combination of a standard, a magnifying mirror tiltably mounted on said standard, a horizontally swinging arm removably pivoted on and carried by said standard, and picture-holding means mounted on and carried by said arm.

6. In a picture-exhibiting device, the combination of a standard, a magnifying mirror mounted on the upper end thereof, and a picture-holding device connected with an intermediate portion of and carried by said standard, said mirror and picture-holding device being so movably related as to enable the angle between their planes to be varied.

7. In a picture-holding device, the combination of a standard, a magnifying mirror mounted on the upper end thereof, a horizontally swinging arm carried by and having a clamping portion engaging said standard, and a picture-holding device movably mounted on said arm.

8. In a picture-exhibiting device, the combination of a standard, a mirror having universal connection with the upper end thereof, a horizontally swinging arm mounted on and carried by said standard, and a picture-holding device mounted on and carried by said arm.

9. In a picture-exhibiting device, the combination of a standard, a mirror having universal connection with the upper end thereof, an arm vertically adjustable on and carried by said standard and adapted to swing in a horizontal plane, and a picture-holding device mounted on and carried by said arm.

JAMES H. BOYE.

In presence of—
 NELLIE B. DEARBORN,
 OTTILIE C. AVISUS.